UNITED STATES PATENT OFFICE.

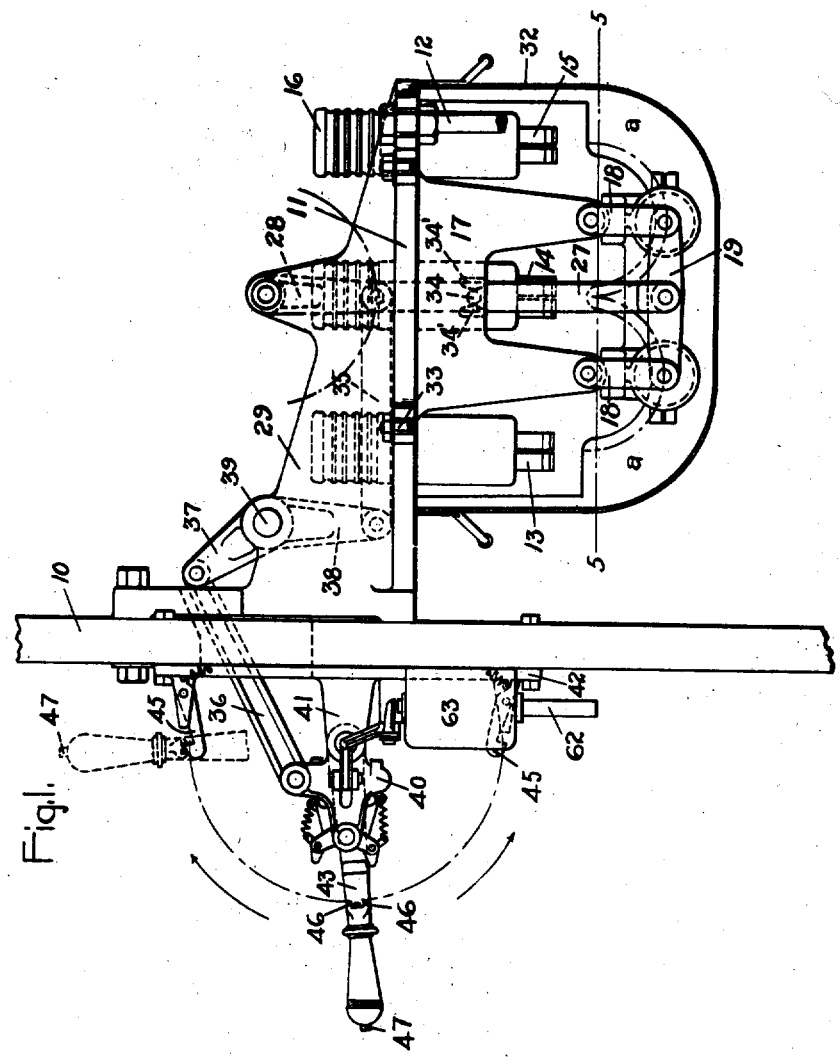

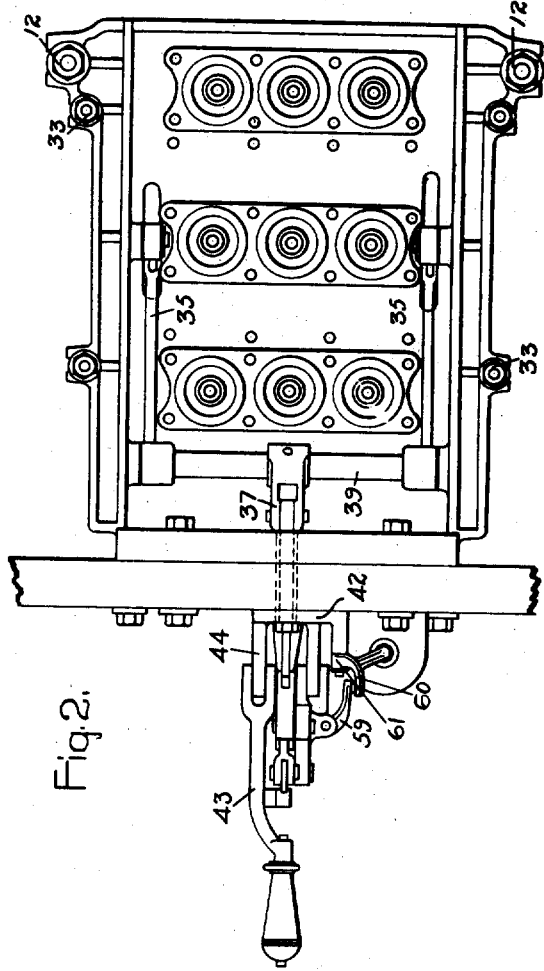
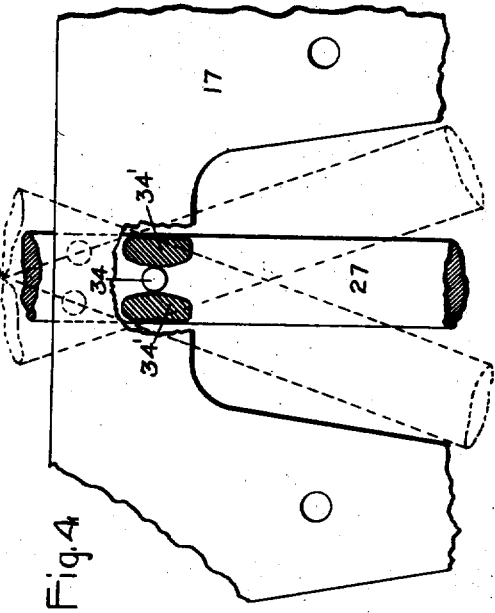
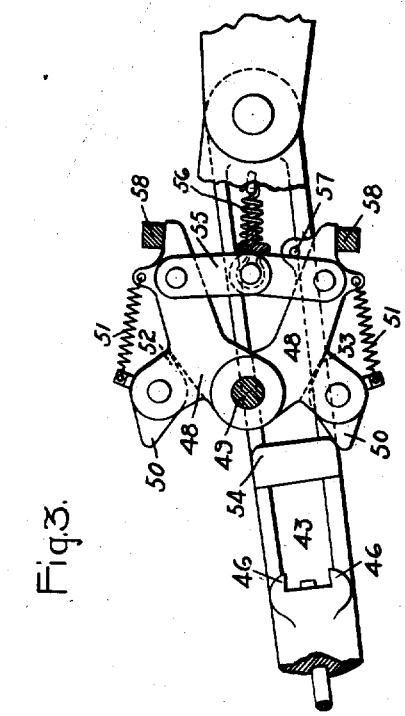

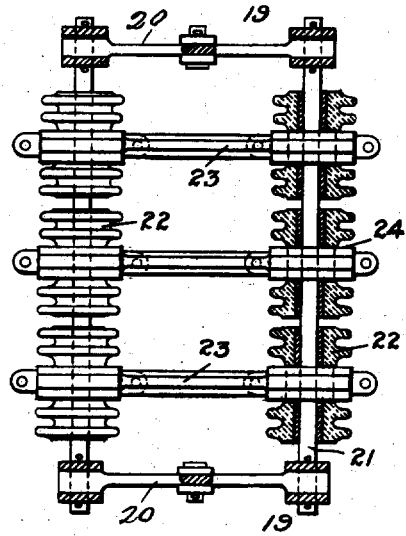
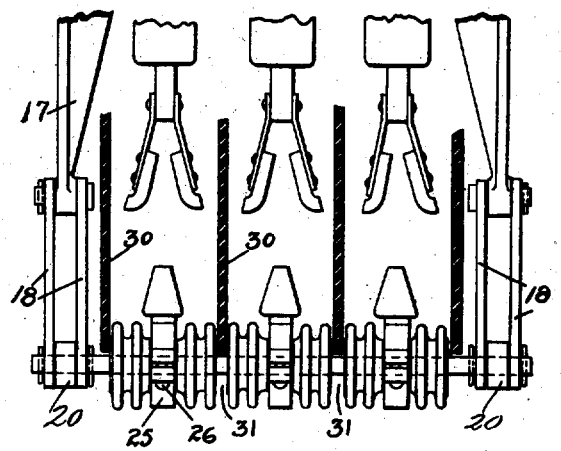
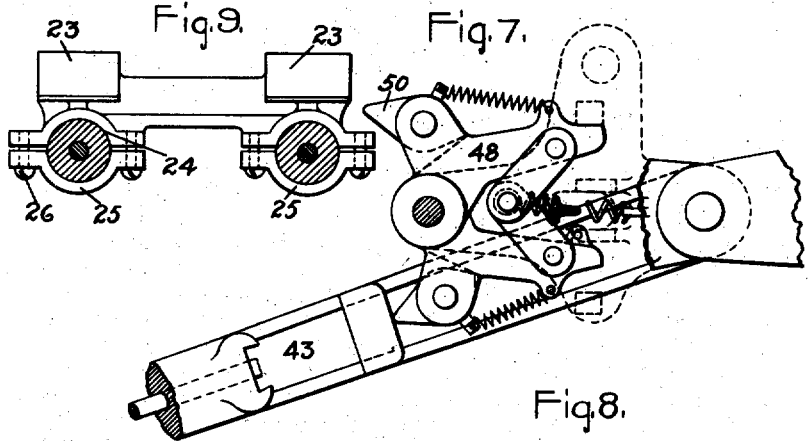
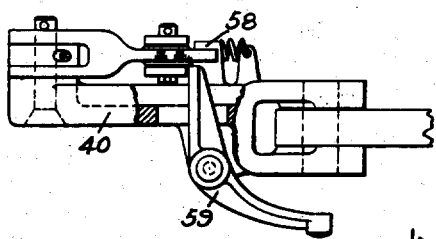

ORAN O. RIDER, OF SCHENECTADY, NEW YORK, ASSIGNOR TO GENERAL ELECTRIC COMPANY, A CORPORATION OF NEW YORK.

ELECTRIC SWITCH.

No. 897,492.   Specification of Letters Patent.   Patented Sept. 1, 1908.

Application filed June 27, 1904. Serial No. 214,215.

*To all whom it may concern:*

Be it known that I, ORAN O. RIDER, a citizen of the United States, residing at Schenectady, county of Schenectady, State of New York, have invented certain new and useful Improvements in Electric Switches, of which the following is a specification.

The invention constituting the subject matter of the present application relates to electric switches, and has particular reference to the latching and tripping mechanism of switches of the double-throw type.

The principal object of the invention is to provide mechanism which shall be simple and compact in structure and which shall operate to free the switch from either of its closed positions irrespective of the manipulation of the operating lever by the attendant.

In carrying out my invention means is provided for clutching the moving element of the switch to the operating lever so that the movement of the latter may be transmitted to the former, and a tripping mechanism actuated from a coil mounted on the base of the switch is arranged to break the clutch connection upon the occurrence of predetermined electrical conditions.

It has been proposed heretofore to provide a single-throw switch with means for connecting the operating lever and the movable element of the switch and tripping mechanism which operates to break this connection whenever the predetermined electrical conditons arise notwithstanding that the operating lever is held closed by the attendant, but I believe I am the first to provide a double-throw switch with such mechanism.

The object and nature of my invention will be more fully understood upon reference to the following detailed description taken in connection with the accompanying drawing in which one embodiment of the invention is disclosed.

Generally speaking, my invention is applicable to any double-throw switch in which movement is transmitted from the operating lever to the movable switch element through a link or equivalent connection. However, for the purpose of fully disclosing my invention, I have shown and described in this application a particular form of double-throw switch which constitutes no part of my invention but is the invention of Edward M. Hewlett and constitutes the subject matter of a separate application.

In the accompanying drawings, which illustrate one embodiment of my invention in connection with the Hewlett switch, Figure 1 is a side elevation of the complete organization; Fig. 2 is a plan view of the same; Fig. 3 is a detailed view of the clutching mechanism by which the movable switch element is connected to the operating lever, the parts being shown in clutched position; Fig. 4 is a detailed view of a portion of the switch mechanism; Fig. 5 is a plan view of the movable element of the switch; Fig. 6 is a rear view of the switch contacts; Fig. 7 is a detailed view similar to Fig. 3, illustrating the clutching mechanism in closed or non-engaging position; Fig. 8 is a plan view of part of this clutching mechanism illustrating particularly the position of the tripping lever; and Fig. 9 is a side view of one of the bridging contacts shown in Fig. 5.

Referring in detail to the accompanying drawings, and more particularly for the present to the Hewlett switch, 10 designates the switchboard or other support upon which the switch is mounted, and 11 designates a horizontal supporting plate for the switch contacts. This plate at its forward end is securely bolted or otherwise secured to the switchboard 10, and at its rear end is supported by standards 12 which are adapted to rest at their lower end upon any suitable support. The plate 11 serves to support the fixed contacts or circuit terminals 13, 14, 15, carried within suitable insulators which are supported upon and extend down through said plate. This plate is also provided with depending side walls 17 to the lower ends of which is connected a plurality of supporting links 18 for the frame 19 of the movable switch element. This frame comprises side members 20 which are connected at their opposite ends by transverse rods 21 upon which are leaded a plurality of grooved insulators 22. These insulators completely surround the rods 21 and support the bridging contacts 23 which are fitted at their opposite ends in grooves 24 in said insulators and are clamped in position thereon by means of straps 25 secured by suitable screws 26. The rods 21 also extend through the links 18 as clearly illustrated and are connected at their centers by links 27 to cranks 28 located directly thereabove and suitably journaled in side walls 29 extending upward from the supporting plate 11. The sets of contacts are separated by barriers 30 which extend downwardly from the supporting plate 11 into close proximity to the movable element of the switch, the lower ends of said barriers extending into the spaces 31 between adjoining insulators, as clearly illustrated in Fig. 6, and being curved concentric with the path of movement of the rods 21 so as always to extend within said spaces 31 into close proximity to the rods 21, as illustrated in Fig. 1. These switch contacts, both fixed and movable, are intended to be submerged in oil contained in the can or receptacle 32 which is secured at its upper end to the supporting frame by any suitable means, as by bolts 33.

From the above description it will be seen that when the cranks 28 are rocked, the bridging contacts of the switch will move either in one direction or the other about the points of connection between the links 18 and end walls 17, as indicated by the dot-and-dash lines, a, a, in Fig. 1, into engagement with the contacts 13, 14 in the one case, and the contacts 14, 15 in the other. These movements are brought about by the upward pull upon the links 27, and since this pull may be obtained by rocking the cranks 28 in either direction, it is necessary in order to insure a movement of the bridging contacts in the right direction, corresponding to a given movement of the cranks, to provide some means for positively giving direction to their movement at the beginning of the pull upon the links 27. This is accomplished by providing the links with a projecting lug or pin 34 and the end walls 17 with coöperating lugs 34' which extend on opposite sides of the lug 34 when the movable switch element is in its lowest position. If now we consider Fig. 1, it will be seen that if the cranks 28 are moved toward the right, the links 27 will be moved as levers about the points of contact between the lugs 34, 34' as fulcra, so as to carry the movable switch contacts toward the left. On the other hand, if the cranks 28 are moved toward the left, the switch contacts will be carried toward the right. In either event however, as soon as the lugs 34 pass the lugs 34' the links 27 will cease to act as levers but will pull directly upward upon the frame 19 of the movable switch element. Rotation is imparted to the cranks 28 from the operating lever located on the front of the board through the agency of links 35, 36 and intervening cranks 37, 38 mounted on the crank shaft 39. This crank shaft is journaled at its opposite end to the upwardly extending walls 29 of the supporting frame 11.

The switch just described, as previously indicated, constitutes no part of my invention.

Referring now to that structure which relates more particularly to my invention, 40 designates a rocking member which is pivoted at its inner end to lug 41 on the base 42, which in turn is secured to the front of the switchboard 10. This plate also supports the operating lever 43 which is pivoted to a lug 44 concentrically with the rocking member 40.

As clearly illustrated in Fig. 1, the link 36 by which movement is transmitted to the switch is pivotally connected at its forward end to a projection on the upper side of the rocking member 40. By means of clutching mechanism hereinafter described, the member 40 and the lever 43 may be rigidly connected so that the movement of the operating lever will be communicated directly to the switch element, the movement of the operating lever upward causing a corresponding movement of the switch to one closed position, and the movement of the operating lever downward causing a movement to the other closed position. In order to hold the operating lever in its upper and lower positions suitable spring-actuated latches 45 are provided. These latches normally lie in a position to engage the lugs 46, 46, on the operating lever 43. A push-pin 47 extends beyond the outer end of the lever and into proximity to the lugs 46, and when the operating lever is engaged by either of the latches 45, the pin may be pressed so as to force the latch out of contact with its lug 46 and thus free the operating lever so that it may be moved to any desired position.

The latch mechanism for connecting the movable member 40 to the operating lever 43 comprises two latch levers 48 pivoted at the point 49 to the movable member 40, as clearly illustrated in Figs. 7 and 8. These latching levers are provided at their outer ends with engaging lugs or projections 50 which are pivoted to said levers and normally held by means of coiled springs 51 in an extended position, a shoulder 52 on said lugs bearing against a coöperating surface 53 on the latching levers 48 to limit the movement of the lugs under the action of the springs. These lugs 50 are adapted to engage a coöperating lug 54 on the operating handle 43, and when they lie in the path of movement of said lug it will be seen that by reason of the particular pivotal mounting of the lugs 50 the operating lever will always freely pass into the space between the lugs 50 but cannot be withdrawn therefrom. Thus it will be seen that in the movement of the operating lever from either position into line with the movable member 40 it will be latched to it.

In order to move the latch levers 48 into a position to bring the lugs 50 into the path of movement of the lug 54, a toggle 55 extending between the inner ends of the latch levers 48 is provided. A coiled spring 56 connected between a fixed point on the movable member 40 and the pivotal point of the toggle serves to draw the toggle into the position illustrated in Fig. 3, in which figure it will be seen that the toggle is slightly overset.

A pin 57 on one of the latching levers 48 limits the movement of the toggle under the action of the spring 56. When the parts are in the latching position (illustrated in Fig. 3) the inner ends of the latching levers 48 closely engage the laterally projecting lugs 58, 58 on the rotatable member 40. Thus it will be seen that in this position a movement of the operating lever 43 against the inner surfaces of the latching lugs 50 will not change the position of the parts, but its force will be transmitted through the engaged lug and the latching levers to the projecting lugs 58 on the rotatable member 40 and thence through the connecting mechanism to the movable switch element.

In order to break the toggle 55, a tripping lever 59 is pivoted to the rotatable member 40 on a vertical pivot and is located so that when actuated one end will strike against the toggle. The other end of this lever terminates in line with the pivots carrying the operating lever 43 and rotatable member 40, so that no matter what the position of these parts, the position of this end of the lever will be practically unchanged. Coöperating with this tripping lever 59 is a lever 60 pivoted on a horizontal pivot 61 to a lug on the base 42. This lever 60 has one end located so as to engage the outer end of the tripping lever 59, while its other end lies in the path of movement of the core 62 of an overload magnet 63 which is connected in any suitable circuit in a manner well known in the art.

From this description it will be seen that when the coil of the magnet 63 is energized the core 62 will rock the lever 60 about its pivot 61 so as to actuate the tripping lever 59 to break the toggle 55 and thereby move the latching mechanism out of latching position and leave the movable element of the switch free to move under the force of gravity into its open position irrespective of the position of the operating handle 43. As soon as the coil 63 is deënergized the spring 56 will reset the toggle 55 and through its engagement with the lever 59 bring said lever as well as the lever 60 into normal position. As previously indicated, when the latching mechanism is returned to engaging position,—that is to the position illustrated in Fig. 3,—the operating lever 43 may be readily latched therewith by moving it into line with the rotatable member 40 which occupies a mid-position when the switch is open, as illustrated in Fig. 1.

It will be apparent that many of the features and combinations of my invention which are herein disclosed in connection with a double-throw switch are capable of use in other connections; I therefore do not wish to be unduly limited as to such uses. Again, many alterations and modifications in the specific matter illustrated may be made without departing from the spirit and scope of the invention, and I accordingly do not wish to be limited to this specific matter, but aim to cover by the terms of the appended claims all such alterations and modifications.

What I claim as new and desire to secure by Letters Patent of the United States, is,—

1. A double throw electric switch biased to open when closed and having its open position between its two closed positions, an operating lever therefor, means for clutching said lever to the movable switch element so as to close the latter, and means for automatically freeing said element from said lever irrespective of the position of the lever.

2. A double throw electric switch biased to open when closed and having its open position between its two closed positions, an operating lever therefor, means for clutching said lever to the movable switch element so as to close the latter, and electrically actuated means responsive to predetermined electrical conditions in its circuit to free said element from said lever irrespective of the position of the lever.

3. An electric switch comprising a support, a movable switch element, an operating lever, a rocking member connected to said element, means for connecting said member to said lever, means for breaking said connection comprising contacting levers carried by said member and support respectively, and a coöperating trip coil also carried by said support and acting on one of said levers to transmit motion to the other.

4. The combination with a suitable support, of a movable switch element, an operating handle therefor, a movable member mounted adjacent to said handle and connected to said switch element, means for latching said member to said handle, a lever carried by said member for tripping said latch, a lever pivoted to said support and movable at all times into engagement with the aforesaid lever, and a tripping coil mounted on said support for actuating the latter lever.

5. In switch-operating mechanism, the combination of a pivoted operating lever, a member pivoted concentrically therewith, means for locking said member and lever together, a tripping lever carried by said member and having an end extending into the line of pivots of said lever and member, and means carried by a fixed member for engaging the end of said tripping lever to actuate it to trip said locking means.

6. In a switch-operating mechanism, the combination with an operating lever and a movable member mounted adjacent thereto, of a lug on said operating lever, a latching lever pivoted to said member and adapted to extend into the path of movement of said lug, a toggle for holding said lever in its latching position, and means for breaking said toggle.

7. In switch-operating mechanism, the combination with an operating lever and a movable member mounted adjacent thereto, of a lug on said operating lever, a pair of latching levers pivoted to said member and adapted to extend at different points into the path of movement of said lug, a toggle for holding said levers in latching position, and means for breaking said toggle.

8. In switch-operating mechanism, the combination with a pivoted lever and a movable member mounted adjacent thereto, of a lug on said operating lever, a pair of latching levers pivoted to said member and adapted to extend at different points into the path of movement of said lug, a toggle for moving said levers, a spring for over-setting said toggle to hold said levers in latching position, and a lever for breaking said toggle to draw said levers out of latching position.

9. In switch-operating mechanism, the combination with an operating lever and a movable member mounted adjacent thereto, of means comprising coöperating lugs carried by said operating lever and movable member respectively for permitting free movement of said operating lever in one direction and for latching said lever to said movable member in its movement in the other direction.

10. In switch-operating mechanism, the combination with an operating lever and a movable member mounted adjacent thereto, of a lug on said operating lever, and a pair of lugs on said movable member extending into the path of the aforesaid lug at different points and means for controlling said lugs so as to permit the free movement of said operating lever into a position between said lugs and to latch said lever to said member upon its movement from said position.

11. An electric switch comprising a support, a movable switch element, an operating lever therefor, latching means for connecting and disconnecting said lever and element, a tripping lever pivoted to said support and operative to trip said latching means when the switch is in any of its closed positions.

12. An electric switch comprising a support, a movable switch element an operating lever therefor, latching means for connecting and disconnecting said lever and element, a tripping lever pivoted to said support and operative to trip said latching means when the switch is in any of its closed positions, and a tripping coil mounted on said support for actuating the tripping lever.

In witness whereof, I hereunto set my hand this 25th day of June, 1904.

ORAN O. RIDER.

Witnesses:
BENJAMIN B. HULL,
HELEN ORFORD.